(12) United States Patent
Groh et al.

(10) Patent No.: US 7,199,065 B1
(45) Date of Patent: Apr. 3, 2007

(54) NON-WOVEN LAMINATE COMPOSITE

(75) Inventors: Werner Groh, Schwabmünchen (DE); Michael Schöps, Grossaitingen (DE); Jörg Lehnert, Schwabmünchen (DE)

(73) Assignee: Johns Manville, Denver, CO (US)

( * ) Notice: Subject to any disclaimer, the term of this patent is extended or adjusted under 35 U.S.C. 154(b) by 1224 days.

(21) Appl. No.: 09/619,535

(22) Filed: Jul. 19, 2000

(30) Foreign Application Priority Data

| Jul. 30, 1999 | (DE) | ................................. 199 35 408 |
| Jul. 30, 1999 | (DE) | ................................. 199 35 531 |
| Oct. 16, 1999 | (DE) | ................................. 199 50 057 |
| Oct. 30, 1999 | (DE) | ................................. 199 52 432 |
| Nov. 18, 1999 | (DE) | ................................. 199 55 713 |
| Nov. 18, 1999 | (DE) | ................................. 199 55 730 |

(51) Int. Cl.

| D04H 1/46 | (2006.01) |
| D04H 1/00 | (2006.01) |
| B32B 5/06 | (2006.01) |
| B32B 9/00 | (2006.01) |
| D02G 3/00 | (2006.01) |
| F16J 15/20 | (2006.01) |

(52) U.S. Cl. ...................... 442/402; 442/331; 442/333; 442/381; 442/383; 428/359; 428/365; 428/387; 428/395

(58) Field of Classification Search ........ 442/381–384, 442/387–407, 415, 327, 355, 357; 428/102, 428/103, 109, 137, 171, 172, 315–319, 325, 428/313.7, 384, 210, 359, 365, 394
See application file for complete search history.

(56) References Cited

U.S. PATENT DOCUMENTS

| 4,230,762 A |   | 10/1980 | Iwasaki et al. |  |
| 4,578,307 A | * | 3/1986 | Niki et al. ................... | 428/288 |
| 4,755,423 A |   | 7/1988 | Greiser et al. |  |
| RE33,023 E | * | 8/1989 | Hiers ......................... | 428/285 |
| 4,892,780 A | * | 1/1990 | Cochran et al. ............ | 428/234 |
| 5,017,426 A | * | 5/1991 | Greiser et al. .............. | 428/280 |
| 5,171,629 A | * | 12/1992 | Heidel et al. ................ | 428/285 |
| 5,229,184 A | * | 7/1993 | Campbell et al. ........... | 428/113 |
| 5,458,960 A |   | 10/1995 | Nieminen et al. |  |
| 5,616,395 A | * | 4/1997 | Baravian et al. ............ | 428/102 |
| 6,235,657 B1 | * | 5/2001 | Schops et al. ................ | 442/57 |

FOREIGN PATENT DOCUMENTS

| DE | 26 22 206 | 12/1977 |
| DE | 3435 643 A1 | 4/1986 |
| DE | 36 05 830 A1 | 8/1987 |
| DE | 3901 152 A1 | 7/1990 |
| DE | 195 21 838 A1 | 12/1996 |
| DE | 195 43 991 A1 | 5/1997 |
| DE | 197 39 049 A1 | 3/1999 |
| EP | 0 132 325 B1 | 1/1985 |
| EP | 0 176 847 A2 | 4/1986 |
| EP | 0 185 169 A2 | 6/1986 |
| EP | 0 187 824 B1 | 7/1986 |
| EP | 0 226 471 A2 | 6/1987 |
| EP | 0 226 471 A3 | 6/1987 |
| EP | 0 315 507 A2 | 5/1989 |
| EP | 0 379 100 B1 | 7/1990 |
| EP | 0 646 454 A1 | 4/1995 |
| EP | 08246358 | 9/1996 |
| EP | 0 806 509 A1 | 11/1997 |
| EP | 0 899 372 A2 | 3/1999 |
| JP | 0010246453 AA | 10/1989 |
| JP | 0070052299 AA | 2/1995 |
| JP | 11-268159 | 1/1999 |
| WO | WO 90/15181 | 12/1990 |
| WO | WO 97/19219 | 5/1997 |
| WO | WO 98/17455 | 4/1998 |

\* cited by examiner

Primary Examiner—Lynda Salvatore
(74) Attorney, Agent, or Firm—Robert D. Touslee

(57) ABSTRACT

The present invention provides non-woven laminate that is not subjected to final consolidation by a binder and the production thereof. The laminate includes at least one non-woven mat containing glass staple fibers pre-consolidated with a resin, and at least one non-woven layer of synthetic fibers. The synthetic non-woven layers and the pre-consolidated non-woven mat of glass fibers are bounded together by needling such that a portion of the fibers of the upper synthetic non-woven layer passes through the non-woven mat of glass fibers possibly through the underlying synthetic non-woven layer. The synthetic fibers are heat shrunken and the laminate is binder free.

37 Claims, No Drawings

NON-WOVEN LAMINATE COMPOSITE

BACKGROUND OF THE INVENTION

1. Field of the Invention

This invention relates to a method of fabricating multilayer laminates made of at least one non-woven layer of inorganic staple fibers and at least one non-woven layer of organic synthetic fibers, the product and use thereof.

2. Description of the Related Art

Laminates composed of bounded fabrics are useful in wall and floor coverings of constructions such as residential and commercial structures. They are particularly useful in insulation and roofing felts, where the laminates are utilized as support material. The bounded fabrics find particular applicability as carriers in bituminized roofing felts and membranes. Naturally, these laminates can be coated with other materials such as polyvinyl chloride.

Various laminates fabricated form at least a non-woven synthetic fibers and non-woven mineral materials are known in the industry. For example, EP 0 176 847 A2 discloses a laminate composed of a non-woven of man-made fibers, in particular of a polyester filament and a non-woven layer of mineral fibers. The non-woven of man-made fibers and also the non-woven of mineral fibers are pre-consolidated and then bound together by needling.

European Patent Document 0 242 524 B1 suggests adding reinforcement yarns in a lengthwise direction, wherein the non-woven material is made of mineral fibers. Example B, discloses that final consolidation of the composite as being accomplished by adding a commonly known binder in the art.

European Patent Document 0379 100 B1 discloses a laminate made of a filamentous non-woven and a glass fiber non-woven, wherein the laminate is produced by first pre-consolidating glass fiber non-wovens and then needling the non-woven with a synthetic fibers non-woven. Subsequently, final setting is completed with an aqueous solution of a polymer free melamine formaldehyde precondensate, the precondensate having a molar ratio melamine/formaldehyde of 1:1.0 to 1:3.5, wherein about 0.5 to 5% by weight of a usual hardener had been added to the solution.

Similar double-ply laminates are described in South African Document ZA 94/02763 A. Additionally, the South African document discloses, inter alia, a three-layer laminate where a non-woven of glass staple fibers is placed between two filament non-wovens of polyester prestabilized by needling whereupon the three layers are bounded together by a further needling process. The filaments of the polyester non-woven are drawn through the non-woven of glass staple fibers.

DE 195 21 838 A1 describes a compact bounded fabric which is made of at least three layers, the intermediate layer being a fabric of organic fibers provided on both sides with a reinforcement layer. Preferably, the two reinforcement layers are made of inorganic fibers. It is further suggested therein to reinforce the bounded fabric by needling and/or by conglutinating with thermal or chemical binders.

EP 0 603 633 B1 describes a flame-retarding laminate of at least one layer of a consolidated spun-laid non-woven, a scrim layer of glass fibers and a metallic foil. The laminate described therein may likewise consist of a scrim of glass fibers which lies in sandwich-like manner between two non-woven layers of polyester filaments and additionally include the prescribed metallic foil. The glass fibers of the scrim layer are threads of glass, that is to say multifilament threads of glass. The glass threads may show a twist but they may be likewise present as non-twisted filament bundles. The layers may be mechanically consolidated, (e.g., by needling) or by means of a chemical binder (e.g., polyvinyl alcohol or butadiene styrene co-polymerized). Thermoplastic adhesives, in particular in form of fibers, may likewise be utilized.

Additional multilayered laminates are described in European Patent Document EP 0 187 824 B1, which includes, inter alia, a textile fiber layer from laid organic fibers. The laminates are treated with a binder on the basis of Fluor polymer dispersions.

European Patent Document EP 0 403 403 discloses multilayered structures where non-wovens of polyester staple fibers are utilized in addition to non-wovens of glass fibers. The glass staple fibers therein need to be very precisely oriented in parallel to the surface.

European Patent Document EP 0 572 891 A1 describes laminates of non-woven and scrim which, except for the metallic foil, show a similar construction as those depicted in EP 0 603 633 B1. These laminates are likewise treated with binders.

European Patent Document EP 0 806 509 describes a support layer which, inter alia, contains a fabric and a reinforcement, wherein the reinforcement serves to neutralize forces, in particular where the elongation ranges between 0 and 1% elongation. Herein, the use of a binder is also suggested.

Some of the disadvantages associated with the laminates described above is that they require a final consolidation, with the aid of binders. The objective of this final consolidation is to improve the strength of the laminate that functions as a support for roofing felts and insulation lines, as well as the product which undergoes bituminization.

Additional drawbacks associated with the commercially available laminates include lack of mechanical strength (e.g., delamination), dimensional stability, tear propagation and flame retardant properties.

To meet the requirements of the roofing, sealing, flooring and insulating industries and to overcome the disadvantages of the related art, it is an object of the present invention to provide bounded fabrics or laminates made of at least one non-woven layer of organic synthetic fibers and a non-woven layer of inorganic staple fibers, which is produced in a quick and facile manner.

It is another object of the present invention to provide a laminate which is not subject to final consolidation through the use of a binder, and provides improved mechanical strength including tear propagation strength, peel strength and nail tear strength upon saturation, impregnation or lamination with bitumen or other synthetics.

It is a further object of the present invention to utilize the laminates as carrier webs and in particular bitumen webs.

It is yet another object of the present invention for the production of laminates which are capable of being easily saturated and impregnated with bitumen or other synthetics and thus may serve as support layers for roofing felts, sealing membranes, floor coverings and the like.

It is a further object of the present invention to provide a method for the production of a laminate which exhibits improved flexibility, dimensional stability during and after bituminization, and special flame retarding properties.

It is yet another object of the invention to provide laminates where as bituminized webs or membranes, the proportion of the synthetic non-wovens vis-a-vis the proportion of non-woven of glass fibers can be reduced without the occurrence of marked drawbacks to bounded fabric, and yet have improved fire retardant characteristics, favorable flexibility and good delamination properties. Additionally, the produced bituminized webs can be easily manipulated as roofing felts in the welding and casting processes. These webs simply do not exert a banana curving effect since they are heat shrunken.

Other objects and aspects of the invention will become apparent to one of ordinary skill in the art upon review of the specification and claims appended hereto.

SUMMARY OF THE INVENTION

In accordance with the inventive laminate and method of production thereof, it has been determined that a laminate of two or more layers can be produced, wherein the laminate is not subjected to a final consolidation through the use of a binder, is capable of being saturated and impregnated, thus providing improved mechanical and thermal properties.

In accordance to one aspect of the invention, a laminate that is not subjected to final consolidation by a binder is provided. The laminate includes at least one non-woven mat containing glass staple fibers pre-consolidated with a resin, and at least one non-woven layer of synthetic fibers. The synthetic non-woven layers and the pre-consolidated non-woven mat containing glass fibers are bounded together by needling such that a portion of the fibers of the upper synthetic non-woven layer passes through the non-woven mat containing glass fibers possibly through the underlying synthetic non-woven layers. The synthetic fibers are heat shrunken and the laminate is not subjected to final consolidation by a binder.

In accordance with another aspect of the invention a method for the production of a laminate of two or more layers is provided. One or more non-woven mat containing glass staple fibers is pre-consolidated with a resin, then placed beneath or between the non-woven layers of synthetic fibers, wherein the non-woven layers of synthetic fibers and the pre-consolidated non-woven mat containing glass fibers are bounded together by needling in such that a part of the fibers of the upper synthetic non-woven passes through the non-woven mat. The synthetic fibers are heat shrunk and laminate is formed without final consolidation through the use of a binder.

DETAILED DESCRIPTION OF THE PREFERRED EMBODIMENTS OF THE INVENTION

The invention will now be described with reference to a preferred embodiment thereof. In a first aspect of the invention at least one non-woven mat of glass staple fibers and at least one layer of a non-woven synthetic fibers as a further layer are bounded. As defined herein, a mat consists of staple fibers (e.g., glass or synthetic ones) or one or more layers of filamentary fibers. The two or more layers are bounded together by needling in such a way that a portion of the fibers of the synthetic non-woven layer passes through the non-woven of glass fibers. The two or more layers are bounded together by needling in a manner where the synthetic fiber may extend through the entire non-woven mat of glass fibers.

The non-woven of synthetic material can be staple fibers, but preferably filamentous fibers. These filamentous fibers are also known to those skilled in the art as "endless" or continuous fibers. The staple fibers or filaments may be present as multicomponent fibers, in particular as bico fibers which are well known in the art. Suitable fiber materials can be selected from a group of polymers or copolymers such as polyester, polypropylene, poly(ethylene terephthalate), polyamides or polyolefins. Preferably, polypropylene and more preferably poly(ethylene terephthalate) are employed. In a preferred embodiment, the synthetic non-wovens can be pre-consolidated mechanically, hydrodynamically, thermally or by calendering at temperatures where the synthetic fibers would shrink in totality. Further, the synthetic non-woven can be shrunk prior to bounding with the glass non-woven layer, before or after pre-consolidation, but preferably before bounding with the glass fiber non-woven.

Naturally, the laminate can include a third layer of synthetic fibers, thus sandwiching the non-woven glass fiber mat therebetween. Where there are two or more non-woven synthetics and in particular two filamentous non-woven layers (e.g., of polyester) present, it is preferred that the ratio of the gsm substance (i.e., weight per area, preferably measured in grams per square meter) of the non-wovens lie in the range of about 1:1 to 1:5. Preferably, the ratio of the gsm substance of these non-wovens lies between 1:1 and 1:2, and preferably the non-wovens are not consolidated prior to needling.

In a preferred embodiment, the pre-fabricated glass non-woven mat is pre-consolidated with a binder prior to bonding to the synthetic non-woven by needling. The diameter of the glass fibers is about 8 to 16 μm, and preferably about 10 to 13 μm. The length of the fibers is about 8 to 32 mm, and preferably 8 to 18 mm. Suitable binder which can be utilized include, for example, urea formaldehyde, melamine formaldehyde, phenolic, epoxy, vinyl acetate, polyvinyl chloride, vinyl alcohol, acrylate and other thermoplastic and thermosetting resin. The amount of the applied binder is about 5 to 45 weight percent, and preferably 10 to 30 weight percent of the non-woven glass fibers.

The glass non-woven may be manufactured using a dry process, but is preferably manufactured using a wet process. Thus, the gsm substance of the glass mat ranges from about 30 to 150 $g/m^2$. Even more preferably, the gsm substance ranges from about 50 to 90 $g/m^2$.

The non-woven layer of glass fibers may include a reinforcement in the form of staple fiber yarns, multifilament yarns, monofilaments or threads of glass, or other synthetic materials, such as high tenacity poly(ethylene terephtalate), aramide, polyester disposed in the longitudinal direction, and other reinforcing materials in the form of scrims. Scrims as used herein, includes laid layers of filaments, as well as woven filaments. The reinforcing filaments, yarns or scrims can also be disposed at any angle to the longitudinal or cross direction (e.g., 10 to 30 degrees). In addition, the reinforcement materials may be disposed between or in other layers. The reinforcements are placed from about 1 to 35 mm apart. The titre of the treads are about 200 to 1500 dtex, and preferably about 300 to 700 dtex. It will readily be recognized by those skilled in the art that dtex or tex is a unit of measurement of g/10,000 m or g/1,000 m, respectively.

The laminate can be produced through either a on-line or off-line process. In accordance with another exemplary embodiment of the invention, a double-ply or layer laminate in the off-line process in manufactured. The laminate includes a pre-consolidated filamentary non-woven of polyester and a pre-consolidated non-woven of glass staple fibers. The non-woven of polyester is pre-consolidated by needling.

The organic synthetic non-woven is preferably made of polyester fibers by the spunbond method described in DE-OS 24 60 755 and herein incorporated by reference in its entirety. Preferably, the synthetic employed is a poly(ethylene terephtalate) or a copolyester. Thereafter, pre-consolidation by needling is performed where 10 to 40 stitches per cm² are placed. The pre-consolidated filamentary non-woven exhibits a gsm substance ranging from about 60 to 350 g/m² and preferably 100 to 230 g/m². Shrinking of the fibers can be executed prior to or optionally after the pre-consolidation. Heat is applied at temperatures in the range of 140 to 220° C. or temperatures corresponding to bitumen containing bath employed to impregnate the laminate with bitumen. Other methods of pre-consolidation such as mechanically, hydrodynamically, thermally (e.g., calender) are contemplated by the inventors and within the scope of the invention.

The non-woven of glass fiber is produced in accordance to a so-called wet process wherein fibers of the E or C class and mixtures thereof or other commercially available glass such as ECR glass are pre-consolidated with a urea, melamine and other binder resins, as discussed above. It will readily be recognized by the skilled artisan that up to 40 percent of the glass fibers can be substituted by other fibers. In particular, cellulose based fibers, polyacrylonitrile, polyester, polyamide, etc.

Wet setting is performed, and a coating ranging from about 5 to 45 percent, and preferably from about 10 to 30 percent is applied. Thus, the gsm substance ranges from about 30 to 120 g/m², and preferably about 50 to 90 g/m². Additionally, reinforcing additives and yarns such as the ones discussed with reference to the previous embodiment can be added to the non-woven glass fiber layer. The pre-consolidated non-wovens of glass are particularly advantageous, as found in a stress-strain-plot measured in the lengthwise direction with a specimen having a width of 5 cm at least 100 N of stress applied, an elongation of <3%, preferably of <2.5% is exhibited.

The two non-woven layer pre-fabricated are superposed and bounded together by needling. The polyester filaments, for example, are advanced in order for at least a part of the filaments to penetrate the non-woven of glass fibers to the side facing away from the synthetic non-woven and possibly cling thereto.

In yet another preferred embodiment, three or more layer laminates are manufactured. For example, a glass fiber layer is disposed on an outer polyester layer, followed by application of a second polyester layer thereon, resulting in a laminate having at least one outer polyester layer.

The off-line process is characterized in that the non-woven of synthetic and the non-woven of glass fibers are separately produced. The synthetic fibers are heat treated, (e.g., by conveying the non-woven through an oven or an IR-field at temperatures of about 140 to about 220° C., in such a manner that subsequent treatment will not induce shrinkage of the fibers and/or non-woven. The non-wovens thus produced are then combined with the non-woven of glass fiber by needling with needles. Accordingly, the use of a binder needed to consolidate the layers is eliminated regardless of the method employed.

In the on-line process, the non-woven of glass is introduced into the laminate in the course of production of the non-woven of synthetic layers. Particularly, one or several curtains of polyester filaments are first deposited on a moving conveyor line. The non-woven of glass fiber is laid upon the one or more layers of polyester, and thereupon additional layers of polyester or are optionally deposited thereon. The non-woven layers of polyester are subjected to heat shrinking prior to combining the different layers, or optionally afterwards.

In accordance with another preferred embodiment, the non-woven of glass is introduced between spunbonds of synthetic non-woven layers of polyester by the so-called on-line process. Spin beams corresponding to the fiber curtains produced (i.e., the synthetic non-woven) are spun or drawn through ducts on a moving deposition area such as a conveyor. Thereupon, the prefabricated non-woven layer of glass staple fibers is laid upon the pre-consolidated or non-consolidated non-woven layer of polyester filament and vice versa. Additional layers are added as desired. In this preferred embodiment, the upper and lower layers of polyester having equal or differing gsm substances are produced and energy in the form of heat is applied to shrink the fibers.

The synthetic fibers may be shrunk separately, and therefore before a non-woven is produced using these shrunken fibers. Preferably, the organic fibers are shrunk when they are present in the form of a non-woven or in the form of corresponding layers. The shrinking may take place before a mechanical or hydro-dynamical pre-consolidation. Optionally, the non-woven is shrunk after a corresponding pre-consolidation. The shrinking is preferably performed by heating in an oven at temperatures of about 140 to 220° C.

In a similar manner, when a double-ply laminate is manufactured, corresponding spin beams are employed to produce the non-wovens, and wherein the synthetic non-woven is deposited on the pre-fabricated glass mat. In a preferred embodiment the synthetic filamental non-woven are shrunk prior to bonding.

In order to obtain a desired final thickness of the laminate the needled laminate/composite can be compressed by treatment with a commercially available calender, or a fabric/belt calender or laminate calender.

In case the synthetic non-wovens are pre-consolidated by needling, 10 to 40 stitches per cm² are placed. Subsequently, the layers are bounded by needling in such a manner where a part of the polyester filaments protrude through the lower surface of the composite/laminate. The needling preferably places 20 to 50 stitches per cm². Naturally, pre-consolidation of the synthetic non-woven and final consolidation of the laminate can be executed in one step, thus elimination the separate pre-consolidation by needling.

The method employed is the on-line or off-line process as discussed above. The needles utilized therein include a distance between the needle point and the barb of approximately 2 to 4 mm. To avoid rupturing or simply damaging the glass fibers, laminate needling is performed at a forward feed ratio at preferably less than 14 mm/stroke. An additional benefit is a significant reduction in glass dust produced.

The glass fiber non-woven layer remains largely intact and presents a considerable improvement with respect to fire retardancy. Additionally, due to the integrity of the glass non-woven obtained, a high stability is attained.

The needles utilized in the present embodiments in conjunction with the forward feed ratio of the stroke maintain a small draft. A draft, as herein defined, occurs when a needle sticks into the non-woven, thereby moving the non-woven in the direction the layers are conveyed. The draft in the needle machine of the preferred embodiment is preferably about 0–13 mm/stroke. Thus, maintaining a small draft provides the laminate with improved mechanical and flame retardant properties.

Needling is preferably executed at 20 to 90 stitches/cm². If pre-needling has been executed, (e.g. at 10 to 40 stitches/cm²) the stitch density during the final needling is correspondingly reduced. Therefore, by the above described methods bounded fabrics or laminates made of at least one non-woven of organic synthetic fibers and of a non-woven of inorganic staple fibers are provided in a facile and economical manner. The laminates exhibit good mechanical strength and, in particular, good delamination qualities. The laminates produced are capable of being easily saturated and impregnated or laminated, with bitumen or other synthetics such as PVC, and modified polyolefins. Thus, they may serve as support layer for roofing felts, roofing and sealing membranes, PVC floor coverings and the like. Particularly, they show an elevated dimensional stability and a special flame retardation property which without the use of binders for final consolidation, will also retain their dimensions during or after bituminization, and virtually eliminates the "neck-down" problems during the impregnation step leading to significantly higher production rates.

In particular the non-woven laminates (e.g. impregnated with bitumen) are endowed, inter alia, with outstanding strength, a favorable flexibility and good delamination properties. These laminates may be manipulated with ease when used as roofing felts in the welding process and the casting process. Additionally, the roof can be walked upon without damaging the felts. In this manner the carrier laminates do not exert banana curving and possess very favorable properties such as nail tear strength, resistance to tear propagation and an elevated peel strength.

The invention will be further explained by the examples provided below, wherein the laminate is consolidated into a final condition without a binder.

EXAMPLE 1

A non-woven mat is produced by the deposition of poly(ethylene therephthalate) filament on a surface or conveyor, and thermally shrinking the non-woven in an oven and subsequently pre-consolidated by needling with 33 stitches/cm². The non-woven has a basic weight of about 180 g/m².

The non-woven was united with a non-woven of glass staple fibers (60 gscm) pre-consolidated with a melamine resin where the non-woven of glass was positioned beneath the non-woven of polyesters. The two non-wovens were connected to one another by needling having 41 stitches/cm² placed thereon at a forward feed ratio of 12 mm/stroke. Subsequently, the non-woven was shrunken in the course of one passage through an oven at 200° C.

At an elongation of ≦3% at a width of 5 cm, the laminate specimen showed a tensile strength of 148 N. The final strength in longitudinal direction was 410 N at a width of a 5 cm specimen and at an elongation of 53%, in transverse direction the strength was 382 N at a width of the specimen of 5 cm and at an elongation of 56%.

After bituminization the strength in longitudinal or, respectively, transverse direction was 900 N and, respectively, 731 N at a width of the specimen of 5 cm.

Surprisingly, it has been found that the strength of 148 N of the non-woven of glass for a specimen of 5 cm width at an elongation of ≦3% allowed an excellent processing for roofing felts. Additionally, it was found that the utilized polymer modified bitumen increased the strength of the roofing felt in such a way without causing a decrease in elongation. The roofing felt thus produced shows an excellent behavior in fire.

EXAMPLE 2

In an on-line process filamentary non-woven of polyesters were spunbond from an installation of 6 spin beam. After the deposition of the first three curtains the layers are heat shrunken and a non-woven of glass staple fibers pre-consolidated with urea and having the same gsm substance as in Example 1 is continuously introduced in transportation direction. Thereafter, three additional curtains are deposited and heat shrunken. Then, pre-consolidated takes place at 10 stitches/cm² and subsequent consolidation with 32 stitches/cm² is executed. Then, the laminate is heat treated in an oven at 200° C.

EXAMPLE 3

In the following table the qualities, (i.e. the maximum tensile load of a bituminized roofing felt) according to the invention are compared with a roofing felt which had been obtained by bituminization of a support web with a binder.

In doing so, a laminate according to the invention has been made without a binder employed for final consolidation and was then lead through a bitumen bath. The same on-line procedure was executed with a laminate which has been consolidated with a binder before bituminization. The binder end-consolidated laminate was a two layer carrier with a 170 g/sqm polyester non-woven and a 60 g/sqm glass non-woven manufactured in accordance with the invention. The laminate without a binder consolidation was a two layer carrier with a 180 g/sqm polyester non-woven and a 60 g/sqm glass non-woven manufactured in accordance with the invention.

TABLE

| | Maximum tensile load after bituminization |
|---|---|
| carrier without binder | |
| MD | 843 N/5 cm |
| CD | 646 N/5 cm |
| carrier with binder | |
| MD | 718 N/5 cm |
| CD | 532 N/5 cm |

MC: Machine Direction
CD: Cross Direction

The comparison of the values shows the strengths of bituminized roofing felts are higher than with those bituminized roofing felts that have been obtained by bituminization of laminates additionally consolidated with a binder.

After being laid on the roof, the roofing felts obtained in accordance with the invention show an improved protection against blistering and delamination. This is caused by the fact that the products of the present invention are considerably better impregnated with bitumen.

To examine the blistering effect bituminized specimens have been treated in the following way. Specimen surfaces having same area in square centimeters are cut out and immersed in water of 60° C. for 14 hours. Subsequently, the specimens are dried over 30 minutes at 110° C. and blistering was observed.

It proved, that blistering was considerably less developed with products according to the invention than with products that had been finally stabilized prior to bituminization.

While the invention has been described in detail with reference to specific embodiments thereof, it will be apparent to those skilled in the art that various changes and modifications can be made, and equivalents employed, without departing from the scope of the claims that follow.

The invention claimed is:

1. A laminate that is not subjected to final consolidation by a binder, comprising:

at least one non-woven mat containing glass staple fibers pre-consolidated with a resin, and at least two non-woven layers of synthetic fibers, wherein the at least two synthetic non-woven layers and the pre-consolidated non-woven mat containing glass fibers are bound together by needling such that a portion of the fibers of one of the synthetic non-woven layers passes through the non-woven layer containing glass fibers and penetrates a side of the layer of glass fibers facing away from the said one layer of synthetic fibers, and through an underlying synthetic non-woven layer, and wherein the synthetic fibers are heat shrunken, the laminate is binder free, and the gsm substance (basis weight) of said layers of synthetic non-woven layers is equal or different.

2. The laminate according to claim 1, wherein said pre-consolidation resin is selected from the group consisting of urea, acrylate, melamine, phenolic, epoxy, vinyl acetate, polyvinyl alcohol and polyvinyl chloride resins.

3. The laminate according to claim 1, wherein the synthetic fibers are selected from the group consisting of polyester, poly(ethylene terephthalate) and polypropylene.

4. The laminate according to claim 1, wherein the synthetic non-wovens fibers are filamentary.

5. The laminate according to claim 1, wherein the synthetic non-wovens fibers are staple fibers.

6. The laminate according to claim 1, wherein the laminate comprises two filamentary synthetic non-wovens layers and a non-woven containing glass fibers in a sandwich-structure where the ratio of the gsm substance of the two filamentary synthetic non-wovens is 1:1 to 1:5.

7. The laminate according to claim 6, wherein the ratio of the gsm substance of said two filamentary non-wovens is about 1:1 to 1:2.

8. The laminate according to claim 1, wherein the synthetic non-wovens are mechanically, thermally or hydrodynamically pre-consolidated.

9. The laminate according to claim 1, wherein the synthetic non-wovens are not consolidated prior to needling.

10. The laminate according to claim 1, wherein the non-woven of glass fibers contains 5 to 45% by weight of a binder resin.

11. The laminate according to claim 1, wherein the non-woven of glass containing fibers contains 10 to 30% by weight of a binder resin.

12. The laminate according to claim 1, wherein the laminate is produced at a minor draft in the needle machine.

13. The laminate according to claim 12, wherein the needle draft is from about 0 to 13 mm/stroke.

14. The laminate according to claim 1, wherein the non-woven containing glass fibers contains glass fibers of the E class, C class, mixtures thereof and ECR glass.

15. The laminate according to claim 1, wherein said synthetic non-woven layer includes filamentary polyesters.

16. A method for the production of the laminate according to claim 1, which comprises pre-consolidating at least one non-woven mat containing glass staple fibers with a resin, disposing said layer between non-woven layers of synthetic fibers, wherein the non-woven layers of synthetic fibers and the pre-consolidated non-woven mat containing glass fibers are bound together by needling such that a part of the fibers of one of the synthetic non-woven layers passes through the non-woven mat containing glass fibers and through an underlying layer of synthetic fibers, heat shrinking the synthetic fibers and forming said laminate without final consolidation through the use of a binder.

17. The method claim 16, wherein said pre-consolidation resin is selected from the group consisting of urea, acrylate and melamine, phenolic, epoxy, vinyl acetate, polyvinyl alcohol and polyvinyl chloride resins.

18. The method of claim 16, wherein said non-woven layers of synthetic fibers are of equal or different thicknesses.

19. The method of claim 16, wherein the synthetic fibers in the non-woven layer are shrunken prior to needling with the non-woven layer containing glass fibers.

20. The method of claim 16, wherein said synthetic fibers are selected from the group consisting of polyester, poly(ethylene terephthalate) and polypropylene.

21. The method of claim 16, wherein said synthetic non-wovens fibers are filamentary.

22. The method of claim 16, wherein the synthetic non-wovens fibers are staple fibers.

23. The method of claim 16, further comprising needling of said non-woven mat containing glass staple fibers and the non-woven layers of synthetic fibers with needles that have a distance between the needle point and the first barb of about 2 to 4 mm.

24. The method of claim 16, wherein said needling is executed with a forward feed ratio for the stroke of less than 14 mm/stroke.

25. The method of claim 16, wherein said non-woven mat of glass staple fibers is reinforced with longitudinal fibers, yarns or scrims.

26. The method of claim 16, wherein the fibers of said synthetic non-woven are shrunken at temperatures of 140 to 220° C.

27. The method of claim 16, further comprising: compressing the laminate with a calender.

28. The method of claim 27, wherein said calender is fabric/belt or laminate calender.

29. The method of claim 16, further comprising shrinking said laminate at temperatures that corresponds at least to the temperature of a bitumen containing bath used for bituminizing the laminate.

30. The method of claim 29, wherein said shrinking temperature is up to 30° C. above the temperature of the bitumen bath.

31. The method of claim 16, wherein said non-wovens layer containing glass fibers includes fibers of the E or C class, mixtures thereof and ECR glass.

32. Bituminized roofing felts or sealing membranes containing the laminate of claim 1 as support.

33. Bitumen shingles containing the laminate of claim 1 as support.

34. Floor covering containing the laminate of claim 1 as support.

35. A laminate that is not subjected to final consolidation by a binder, comprising:
at least one non-woven mat containing glass staple fibers pre-consolidated with a resin, and at least one non-woven layer of synthetic fibers, wherein the at least one synthetic non-woven layer and the pre-consolidated non-woven mat containing glass fibers are bound together by needling such that a portion of the fibers of the synthetic non-woven layer passes through the non-woven layer containing glass fibers and penetrates a side of the layer of glass fibers facing away from the layer of synthetic fibers, and optionally through any underlying synthetic non-woven layer, and wherein the synthetic fibers are heat shrunken and the laminate includes reinforcement and is binder free.

36. The laminate according to claim 35, wherein reinforcements are fibers, yarns running in lengthwise direction or scrims.

37. The laminate according to claim 36, wherein the reinforcements are disposed within or between the layers of the laminate.

* * * * *